(12) United States Patent
Nakai

(10) Patent No.: US 6,449,860 B1
(45) Date of Patent: Sep. 17, 2002

(54) GOLF CLUB MEASURING APPARATUS

(76) Inventor: Etsuo Nakai, 1-21-509 Nagaehigashi 2-chome, Kita-ku, Ohsaka-shi, Osaka (JP)

( * ) Notice: Subject to any disclaimer, the term of this patent is extended or adjusted under 35 U.S.C. 154(b) by 0 days.

(21) Appl. No.: 09/680,404

(22) Filed: Oct. 5, 2000

(30) Foreign Application Priority Data

Nov. 8, 1999 (JP) .......................................... 11-317082

(51) Int. Cl.[7] ................................................ G01B 1/00
(52) U.S. Cl. ...................................................... 33/508
(58) Field of Search ........................ 33/508, 534, 535, 33/549, 573, 712, 1 U, 1 N; 473/282, 287, 290, 409; 73/65.01, 65.03, 65.07, 65.08

(56) References Cited

U.S. PATENT DOCUMENTS

| | | | | |
|---|---|---|---|---|
| 2,546,426 A | * | 3/1951 | Bryant | 33/508 |
| 3,439,429 A | * | 4/1969 | Sundstrom | 33/508 |
| 3,822,477 A | * | 7/1974 | Collins | 33/508 |
| 4,245,392 A | * | 1/1981 | Heller | 33/508 |
| 4,875,293 A | * | 10/1989 | Wakefield | 33/508 |
| 5,105,550 A | * | 4/1992 | Shenoha | 33/508 |
| 5,421,098 A | * | 6/1995 | Muldoon | 33/508 |

FOREIGN PATENT DOCUMENTS

| | | | | |
|---|---|---|---|---|
| GB | 2269022 A | * | 1/1994 | A63B/53/00 |
| JP | 02193001 A | * | 7/1990 | 33/508 |
| JP | 08086603 A | * | 4/1996 | A63B/53/00 |
| JP | 9-028840 | | 2/1997 | |
| JP | 2001-000591 | | 1/2001 | |

* cited by examiner

Primary Examiner—Diego Gutierrez
Assistant Examiner—Mirellys Jagan
(74) Attorney, Agent, or Firm—Oblon, Spivak, McClelland, Maier & Neusdadt, P.C.

(57) ABSTRACT

A golf club measuring apparatus for measuring the face progression, lie angle, loft angle of a face includes a base having a flat top reference surface, and a club-holding assembly pivotally mounted on the base for pivotal movement. A shaft of a golf club is grasped by the club-holding assembly with a space kept from the reference plane. An orientation of an iron club is regulated by a club face regulator while an orientation of a wooden club is regulated by a measuring piece.

20 Claims, 12 Drawing Sheets

GOLF CLUB MEASURING APPARATUS

BACKGROUND OF THE INVENTION

This invention relates to a golf club measuring apparatus for measuring the lie angle, loft angle, face progression, sole angle, sole orientation, sole inversion, and neck offset progression of a golf club including a putter.

U.S. Pat. No. 5,105,550 discloses the golf club measuring apparatus for measuring the lie angle, face loft angle, or face progression of a golf club (called the "club" hereinafter). These items are measured by placing the club on the club-holding assembly which is inclined with respect to the horizontal base, regulating the orientation of the club face to a certain direction using the face regulating member, and keeping the club in a predetermined posture.

The foregoing measuring apparatus is advantageous in that the lie angle, loft angle or face progression can be measured without changing the posture of the club. However, since the club is placed with the sole of the club head in contact with the base, it is rather difficult to measure items such as sole angle of the head, original loft or real loft of a wooden club head which are related to a sole of the club head.

SUMMARY OF THE INVENTION

In accordance with the invention, there is provided a golf club measuring apparatus comprising: a base having a flat top reference surface; a club-holding assembly pivotally mounted above the flat top reference surface of the base for pivoting movement about a pivot axis; club-gripping member for releasably holding a club shaft, including a pair of grooved frames which are provided with v-shaped grooves, face with each other, are arranged at least at two positions on the club-holding assembly, and have a reference line passing through the centers of the v-shaped grooves and obliquely intersecting with the reference surface of the base; a Y-direction slide plate provided on the base and being slidable in a direction (Y direction) which is parallel to the line of intersection between a virtual vertical plane including the reference line and the reference plane; an X-direction slide plate detachably arranged on the Y-direction slide plate and being movable in a direction (X direction) which is orthogonal to the sliding direction of the Y-direction slide plate; a pole standing upright on the X-direction slide plate; a club face regulator provided on the pole, being vertically movable, and having a reference line parallel to the Y direction; and a protractor provided with a scale on an circular surface around the pivot axis and used for measuring an angle of inclination of the reference line with respect to the reference surface. Various angles of an iron club can be measured with a club head spaced from the reference surface and without changing the posture thereof.

When measuring a wooden club, the head-holding assembly detachably mounted on the Y-direction slide plate will be used in order to hold a head of the wooden club grasped by the club-holding assembly. The head-holding assembly includes retractable projections provided at positions corresponding to a toe, heel and rear part of the sole, the retractable projections regulating the sole of the club head.

The X-direction slide plate is symmetrical in the plane which includes the centerline of the foregoing pole and traverses the direction X.

When measuring an iron club, the club face regulator movably attached to the upright pole on the X direction slide plate is used, so that angles of the golf club can be easily measured with the club head spaced from the base and without changing the posture of the club.

Further, in the case of a wooden club, the club is supported by the club-holding assembly, and the club head is placed on the head-holding assembly detachably attached to the Y direction slide plate, which facilitates the measurement of the original loft or real loft.

The X direction slide plate is symmetrical in the plane which includes the X direction the center line of the pole and traverses the X-direction, so that clubs for right-handed users and those for left-handed users can be measured without changing components of the measuring apparatus.

DESCRIPTION OF THE PREFERRED EMBODIMENTS

Figure 1:
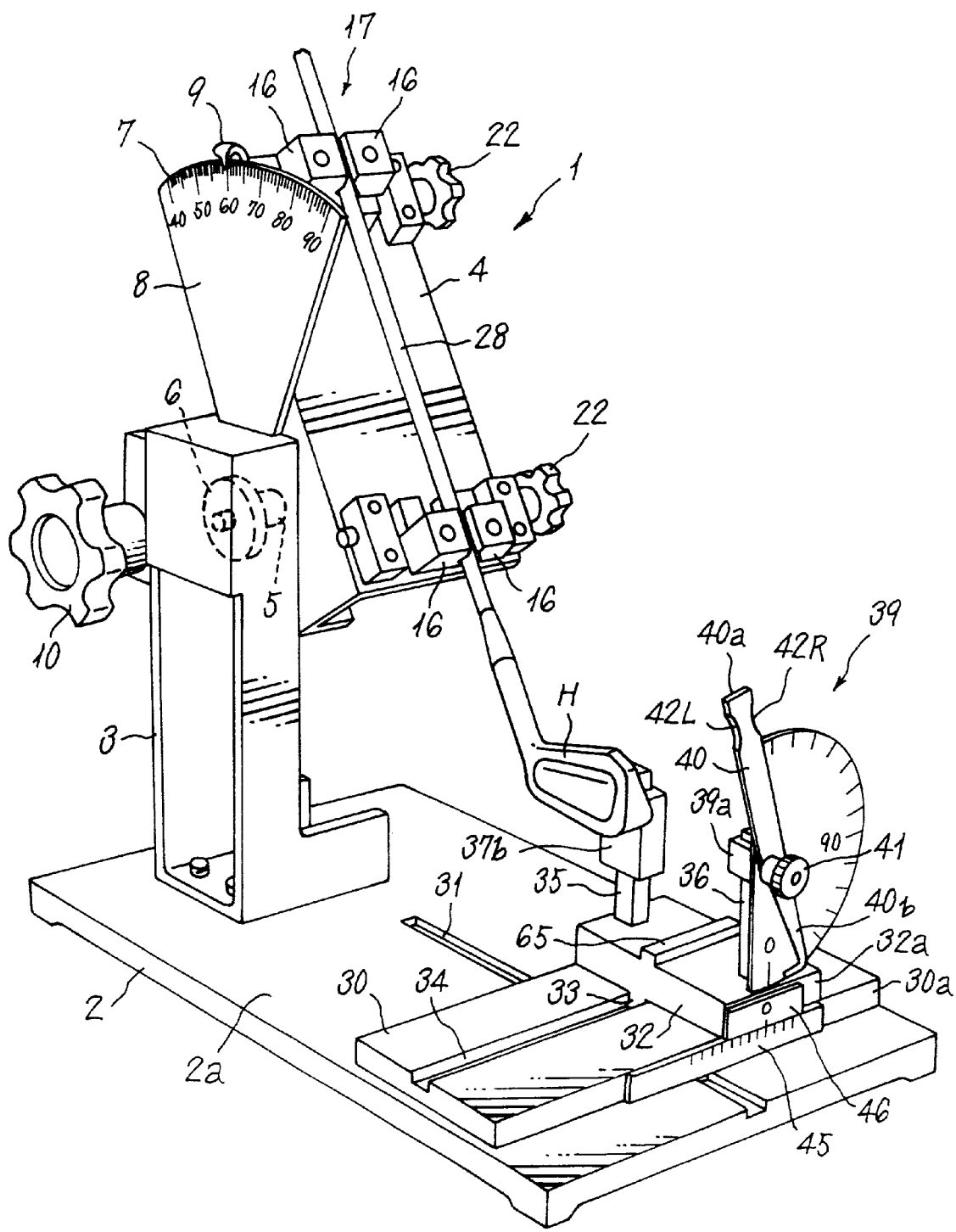
FIG. 1 is a perspective view of a golf club measuring apparatus according to a first embodiment of the invention.

Referring to FIG. 1, reference numeral 1 denotes a golf club measuring apparatus, reference numeral 2 denotes a base with a flat top reference surface 2a, and reference numeral 3 denotes a post whose bottom is fixedly attached on the base 2. A club-holding assembly 4 in the shape of a strip is movably attached to the upper end of the post 3 via a pivot shaft 5. The pivot shaft 5 has its base end fixedly attached to the club-holding assembly 4, and includes a large gear 6 (to be described later) at a tip thereof (refer to FIG. 2).

A protractor 8 for measuring the lie angle is provided at the top of the post 3, and has a scale 7 which is arranged about the pivot shaft 5 as the center. In other words, a base portion of the protector 8 is fixedly attached on the post 3. The protractor 8 is used to measure an inclination angle of the club-holding assembly 4 with respect to the foregoing reference surface 2a of the base 2. A measured angle is indicated by a pointer 9 which is fixed on the top edge of the club-holding assembly 4.

Figure 2:
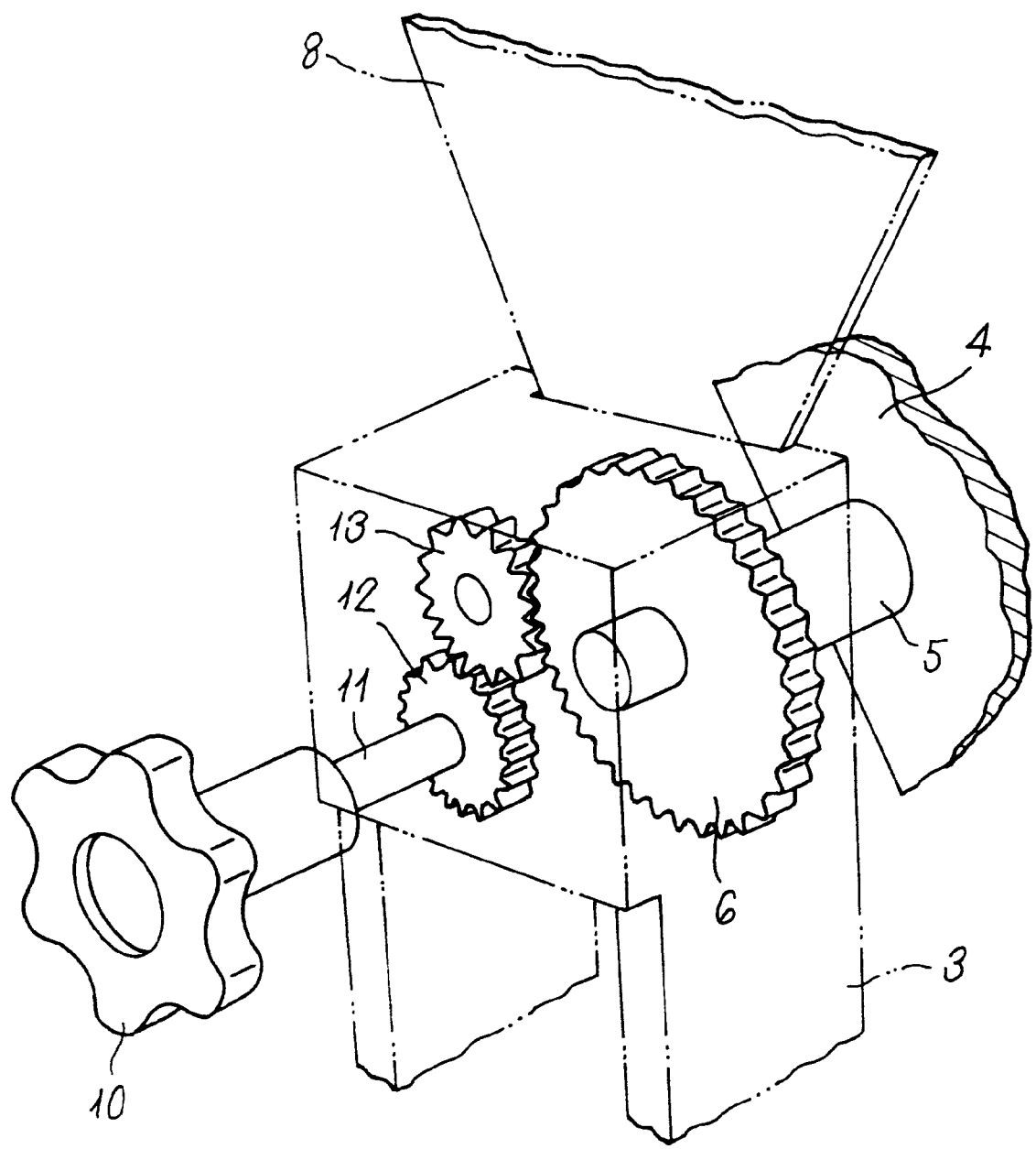
FIG. 2 is a perspective view of a gear train for swinging a club-holding assembly.

A knob 10 is rotatably attached on an upper side of the post 3, and is used to swing the club-holding assembly 4. A small gear 12 is fixedly attached on an inner end of a shaft 11 of the knob 10, and is engaged with a large gear 6 via an intermediate gear 13, as shown in FIG. 2.

The small, intermediate and large gears 12, 13 and 10 constitute a speed reduction gear train which reduces a rotating speed of the knob 10 and transmit a rotational force to the club-holding assembly 4. The speed reduction gear train includes an odd number of intermediate gears. Therefore, the large gear 6, i.e. the club-holding assembly 4, turns in the same direction as that of the knob 10.

Figure 3:
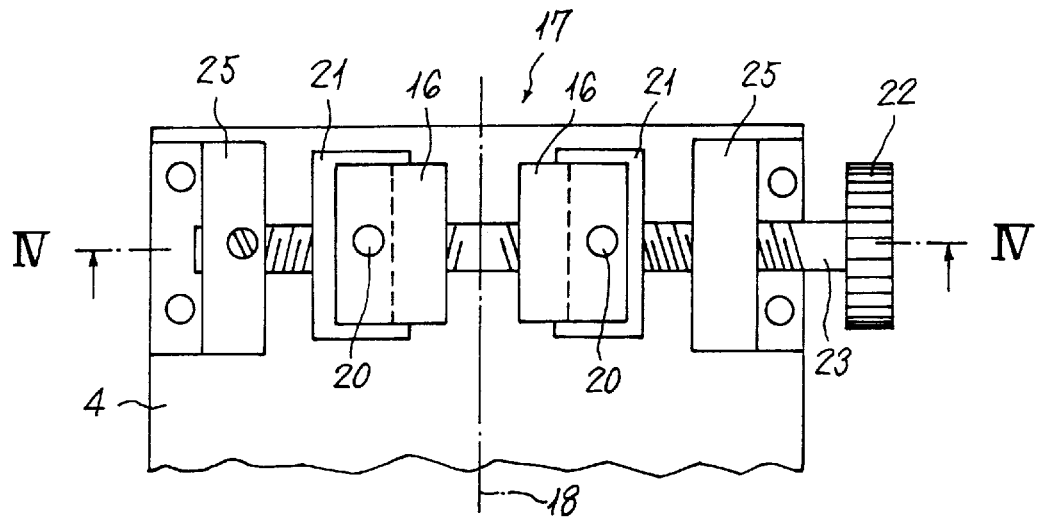
FIG. 3 is a front elevation of a gripper for grasping a club shaft.
Figure 4:
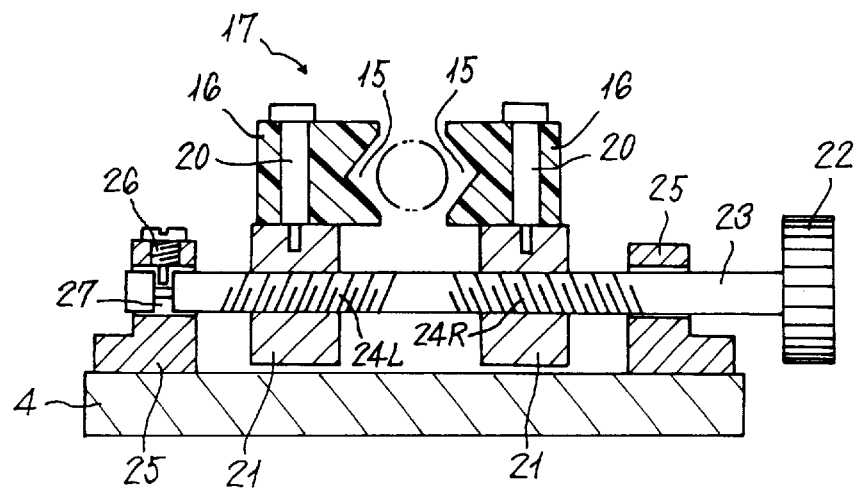
FIG. 4 is a sectional view of the gripper taken along the line IV—IV in FIG. 3.

Referring to FIGS. 1, 3 and 4, a gripper 17 for grasping a club shaft is provided at upper and lower parts of the club-holding assembly 4. The gripper 17 includes two pairs of grooved frames 16. In each pair of grooved frames 16, V-shaped grooves 15 face with each other. A reference line passing through the center of the V-shaped grooves 15 is parallel to the club-holding assembly 4. Each grooved frame 16 swings on each slider 21 via a shaft 20. There are provided two knobs 22 and two feed rods 23. Each slider 21 is engaged via one end thereof with one feed rod 23 having one knob 22 at its one end. The feed rod 23 is provided with a right-hand thread 24R and a left-hand thread 24L. The sliders 21 are engaged with these threads 24R and 24L. Therefore, when the knob 22 is turned left or right, the sliders 21 facing with each other, i.e. the grooved frames 16, are moved toward and away from each other.

Each feed rod 23 is rotatably supported by a pair of bearings 25 provided on the club-holding assembly 4. The axial movement of each feed rod 23 is regulated by loosely engaging a tip of small screw 26, which is threadably engaged with one of the bearings 25, with a groove around the feed rod 23.

Figure 5:
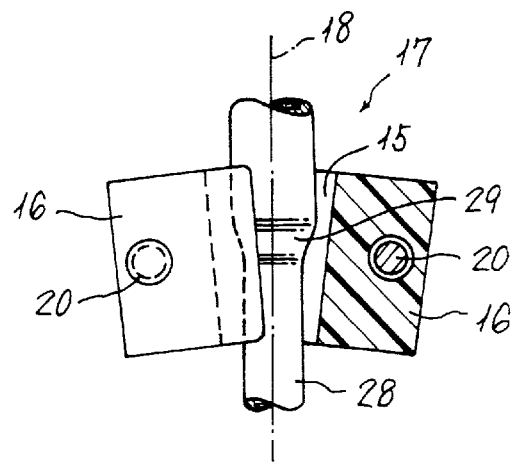
FIG. 5 shows the state in which the club shaft is grasped by a pair of grooved frames of the gripper.

The grooved frames 16 are capable of swinging as described previously. Therefore, even if the club shaft 28 has a step 29, the gripper 17 tightly grasps the step 29, and the grooved frames 16 incline so as to reliably hold the club shaft 28, as shown in FIG. 5.

The center line of the shaft 28 grasped by the gripper 17 agrees with the reference line 18, i.e. it is parallel to the club-holding assembly 4.

On the flat top reference surface of the base 2, there is provided a Y-direction slide plate 30 which is slidable in the direction (called the "direction Y" hereinafter) parallel to a line of intersection between the virtual vertical plane including the reference line 18 and the reference plane. The Y-direction slide plate 30 has a long projection on the bottom thereof, which is engaged with a recess 31 on the base 2, so that movement of the Y-direction slide plate 30 is regulated on the base 2.

An X-direction slider plate 32 is provided on the Y-axis slide plate 30, and is movable in the direction (called the "direction X") which is orthogonal to the moving direction of the Y-axis slide plate 30. The X-direction slide plate 32 has a long projection 33 on its bottom surface, which is engaged with a recess 34 on the Y-direction slide plate 30, so that movement of the X-direction slide plate 32 is regulated on the Y-direction slide plate 30.

Two square poles 35 and 36 stand upright on the X-direction slide plate 32 with a spaced maintained therebetween.

Figure 6:
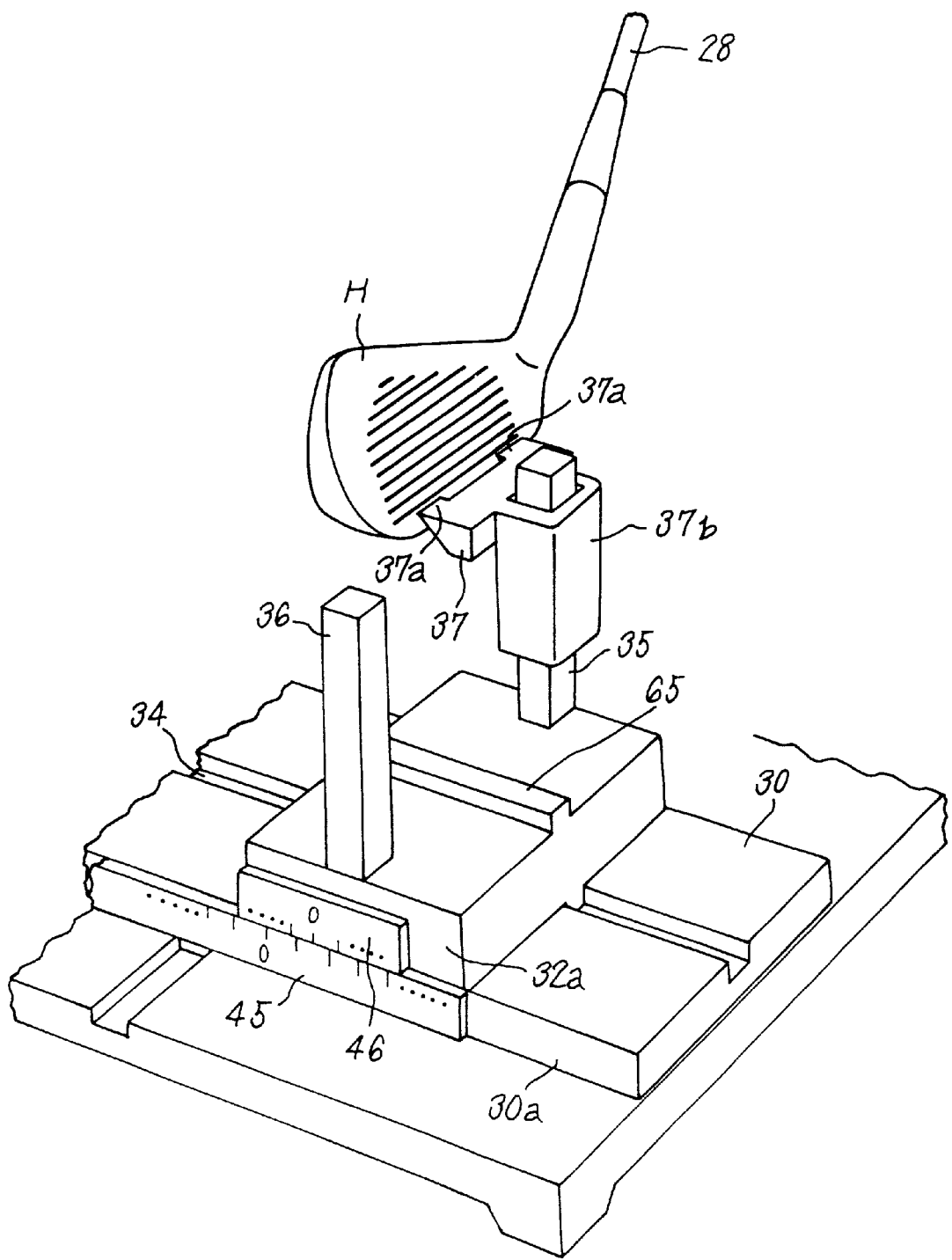
FIG. 6 is a perspective view showing that the club is maintained in a predetermined posture by a club face regulator.

Referring to FIG. 6, the pole 35 is provided with a club face regulator 37 which has a reference edge 37a and is vertically movable on the post 35. The pole 36 includes a protractor 39 which is vertically movable thereon as shown in FIG. 1. The club face regulator 37 and the protractor 39 can be made immovable at desired positions on the poles 35 and 36 by fitting their quadratic prism 37b and 39a around the poles 35 and 36 with appropriate friction applied therebetween.

The X-direction slide plate 32 is symmetrical with respect to the plane including the center line of the posts 35 and 36.

The protractor 39 includes a ruler 40 which has a pair of arms 40a and 40b extending from the center of the protractor 39 and performing pivoting movement about the center of the protractor 39. The arm 40a comes into contact with a club face, while the arm 40b indicates divisions of the protractor 39.

The ruler 40 is swingably attached to the center of the protractor 39, and is made to swing by loosening a knob 41.

The arm 40a is formed with concaves 42R and 42L which receive a sole of an iron club whose face orientation is regulated by the club face regulator 37.

The Y-direction slide plate 30 has a scale 45 on its side surface 30a parallel to the direction X. The scale 45 is used to measure a distance between the X-direction slide plate 32 and the foregoing virtual vertical plane. Further, a vernier 46 is provided on a side surface 32a of the X-direction slide plate 32. The scale 45 and vernier 46 constitute a caliper.

The division "0" of the vernier 46 is present in the virtual vertical plane including the inner side surfaces of the poles 35 and 36 while the division "0" of the scale 45 is in the virtual vertical plane including the reference line 18.

Another vernier 46 is provided on the side surface opposite to the side surface 32a in order to measure clubs for left handed users, as will be described later. For this purpose, the X-direction slide plate 32 will be turned by 180° with respect to the Y-direction slide plate 30.

Figure 7:
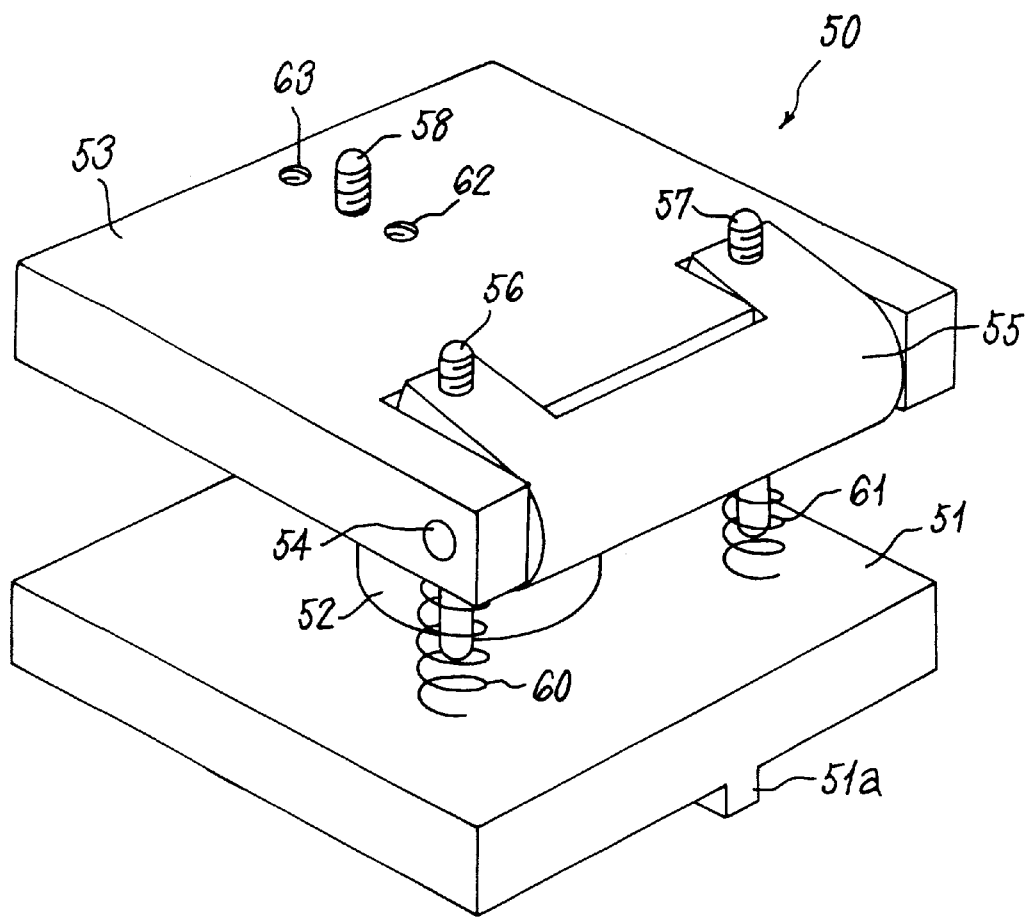
FIG. 7 is a perspective view of a head-holding assembly for supporting a club head.
Figure 8:
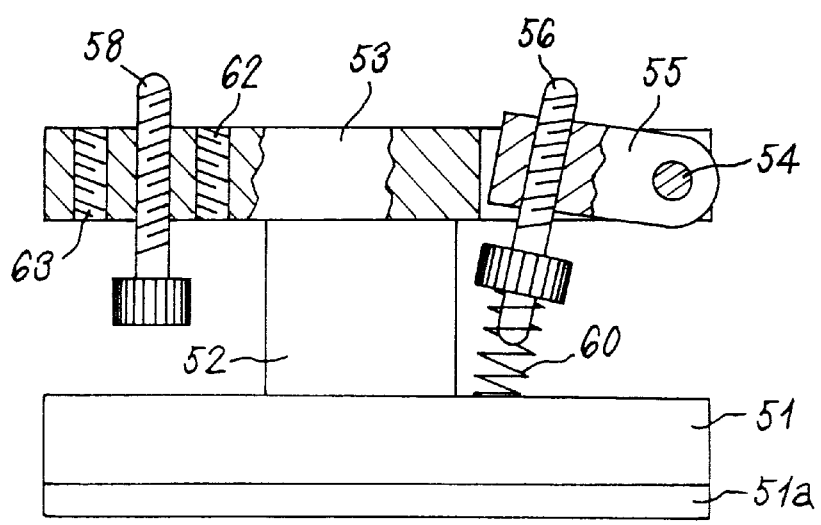
FIG. 8 is a fragmentary side elevation of the head-holding assembly of FIG. 7.

FIGS. 7 and 8 show a head-holding assembly 50 which is detachably attached on the Y-direction slide plate 30, and is used to place a sole of a wooden club head grasped by the club-holding assembly 4.

The head-holding assembly 50 includes: a substantially square bottom plate 51; an upper plate 53 fixed to the top of a short post 52 at the center of the bottom plate 51; a rocking piece 55 swingably supported at a side of the upper plate 51 about a shaft 54 extending in the direction Y; a pair of projections 56 and 57 at the front and rear parts of the rocking piece 55, the projections 56 and 57 being positioned on the upper plate 53 so as to face with the toe and heel of the sole of the club head, respectively; a projection 58 positioned on the upper plate 53 so Was to face with the rear part of the sole; and a pair of compression springs 60 and 61 located between the lower parts of the projections 56 and 57, and the bottom plate 51. The compression springs 60 and 61 urge the rocking piece 55 to lift the projections 56 and 57.

The projections 56, 57 and 58 are actually screws, and their projection amounts are controlled by rotating knobs at their bottoms. Female screws 62 and 63 are formed in front of and behind the projection 58, so that the projection 58 is selectively inserted into the female screw 62 or 63.

The bottom plate 51 has on its lower surface a projection 51a extending in the direction X. The head-holding assembly 50 has the long projection 51a engaged with the recess 34 of the Y-direction plate 30, so that the head-holding assembly 50 is slidable on the-Y-direction plate 30 and is positioned adjacent to the X-direction slide plate 32.

Figure 9:
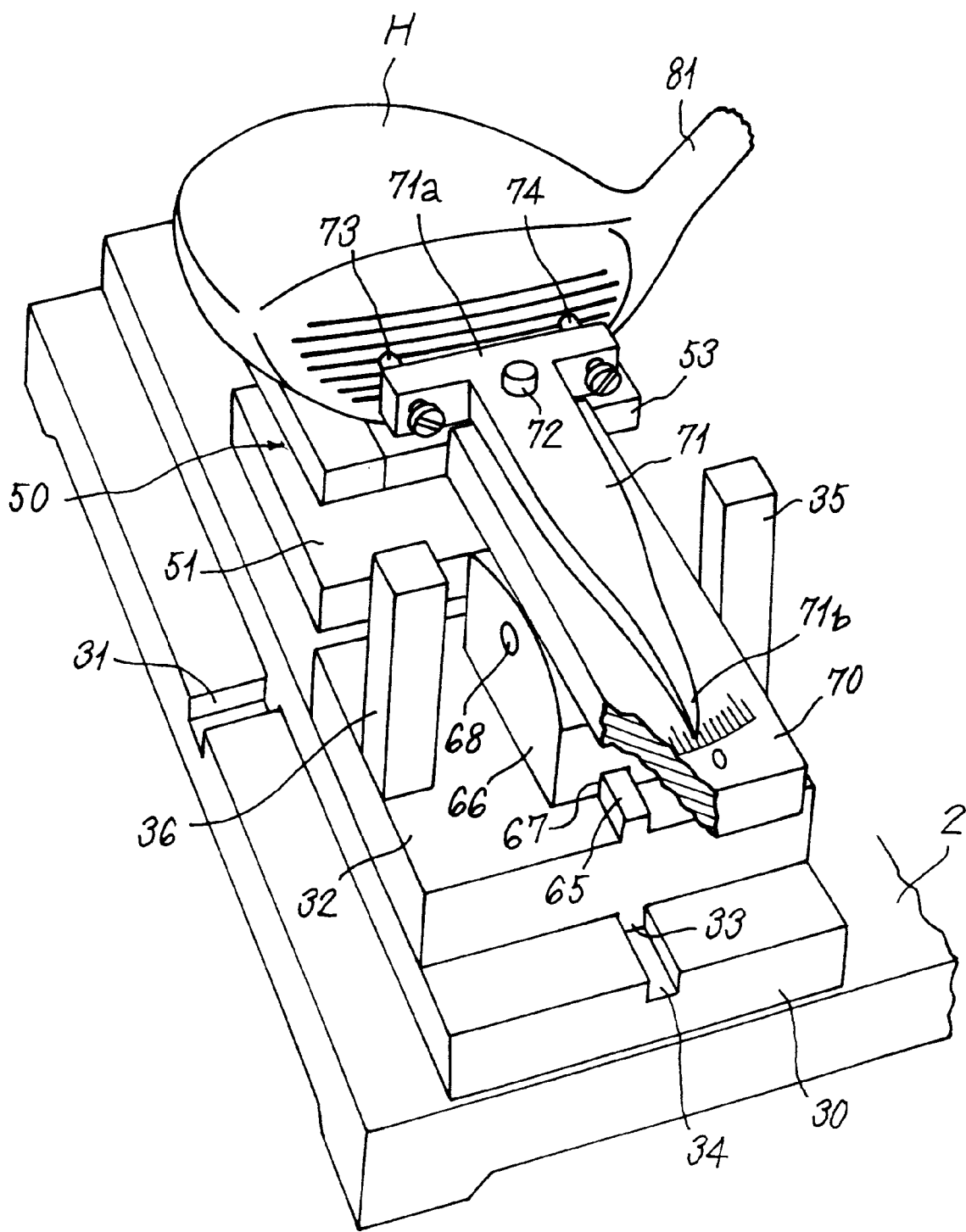
FIG. 9 is a perspective view showing that a wooded club is maintained in a predetermined posture by a measuring piece.
Figure 10:
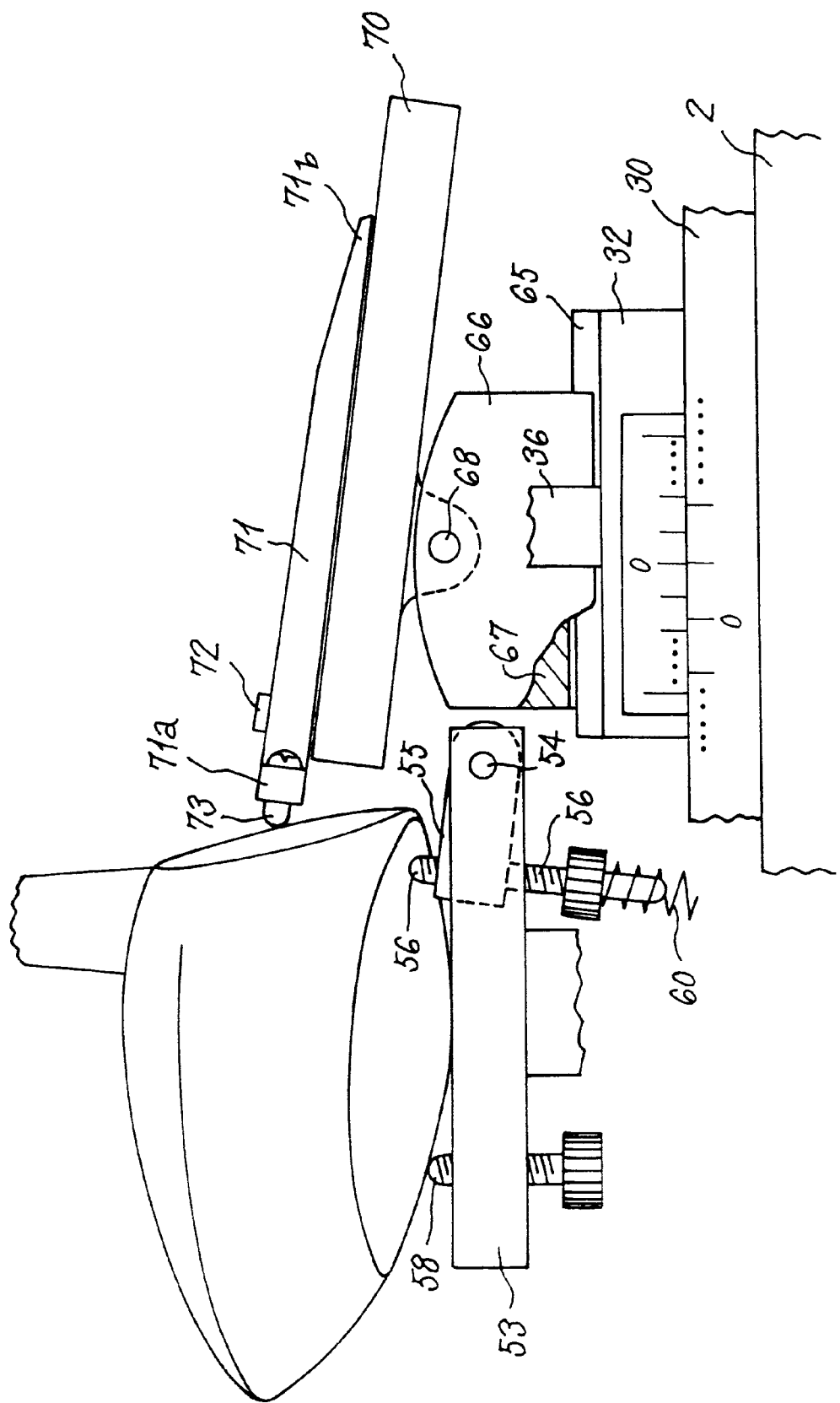
FIG. 10 is a side elevation of FIG. 9.

The X-direction slide plate 32 is provided on its surface with a long projection 65 extending in the same direction as that of the projection 33. Referring to FIGS. 9 and 10, a recess. 67 of a protractor stand 66 is engaged with the long projection 65 so that the protractor stand 66 is slidable on the X-direction slide plate 32. A protractor 70 in the shape of a strip is pivotally supported about a pivot shaft 68 extending in the direction Y. The protractor 70 has at its one end a measuring piece 71 which is used for measuring the face angle and is swingable about a vertical shaft 72.

Threaded projections 73 and 74 are provided on one end 71a of the measuring piece 71 with a predetermined space maintained therebetween. A tapered end 71b of the measuring piece 71 indicates divisions of the protractor 70, thereby showing an inclination angle of the measuring piece 71 to the protractor 70.

Measurement of Iron Club

Referring back to FIG. 1, first of all, an iron club is grasped by the club-holding assembly 4 with a club shaft 28 lightly caught between the grooved frames 16 of the gripper 17 so that the face of the club head H is positioned to be substantially flush with the club face regulator 37 (shown in FIG. 6).

Next, the knob 10 (shown in FIG. 1) is turned in order to adjust the inclination angle of the club shaft 28 and engage the reference edge 37a of the club face regulator 37 with a groove on the club face, as shown in FIG. 6. Thereafter, the club shaft 28 is turned in order to adjust the orientation of the club face. The club face regulator 37 is moved up and down on the pole 35 so that the reference edge 37a of the club face regulator 37 is engaged in the lowermost groove on the club face. In this state, the knob 22 is tightened in order to tightly grasp the club shaft 28 using the gripper 17, thereby firmly supporting the club in the measurement posture with the club-holding assembly 4.

The following measurements are performed for the club which is maintained in the measurement posture.

Measurement of Lie Angle

The lie angle of the club indicated by the pointer 9 on the protractor 8 is read (e.g. 60 degrees).

Measurement of Loft Angle

The knob 41 is turned counterclockwise and is slightly loosened. The ruler 40 of the protractor 39 on the pole 36 (shown in FIG. 1) is turned in order to bring the arm 40a into contact with the face of the club. Then, the loft angle indicated by the arm 40b is read (e.g. 25 degrees). If necessary, the knob 41 is fastened so as to firmly attach the ruler 40 to the protractor 39.

Measurement of Progression Angle

Figure 12:
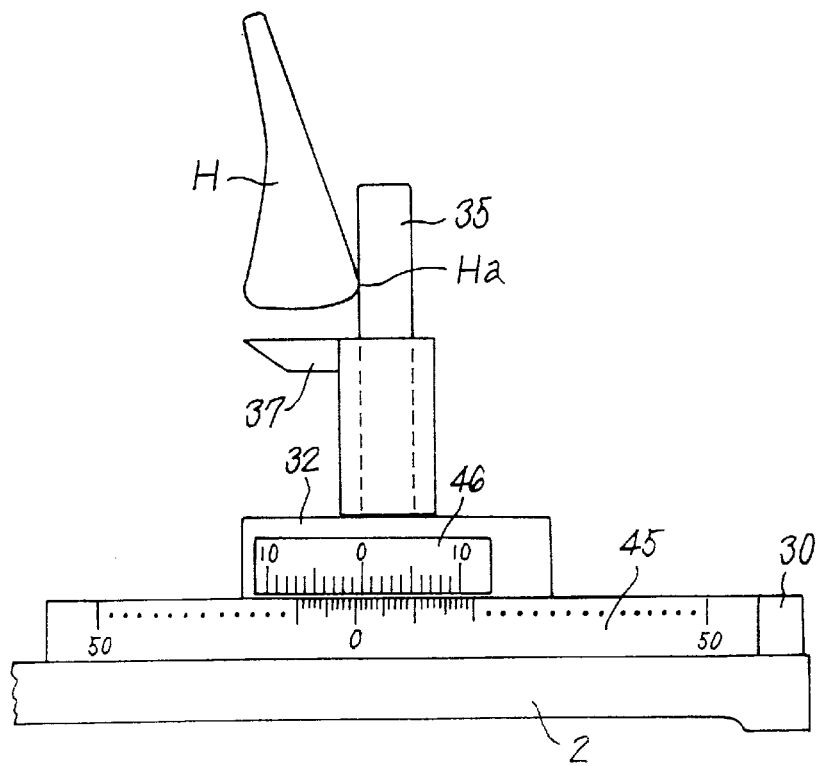
FIG. 12 is a front elevation showing one example of method for measuring the progression of a leading edge.

Referring to FIG. 12, the pole 35 with the club face regulator 37 positioned at the bottom thereof is moved and the X-direction slide plate 32 is moved in the direction X. The pole 35 comes into contact with the leading edge Ha of the club head H. A division of the scale 45 is read on the basis of the division "0" of the vernier 46 (e.g. 3 mm).

Since the leading edge Ha of the club head H is moderately curved, the progression angle is measured at the position where the club head bulges most extensively.

If the height of the club head H is relatively low and if the club face regulator 37 drags on the measurement, the club face regulator 37 may be detached from the pole 35.

Measurement of Sole Angle

Figure 13:
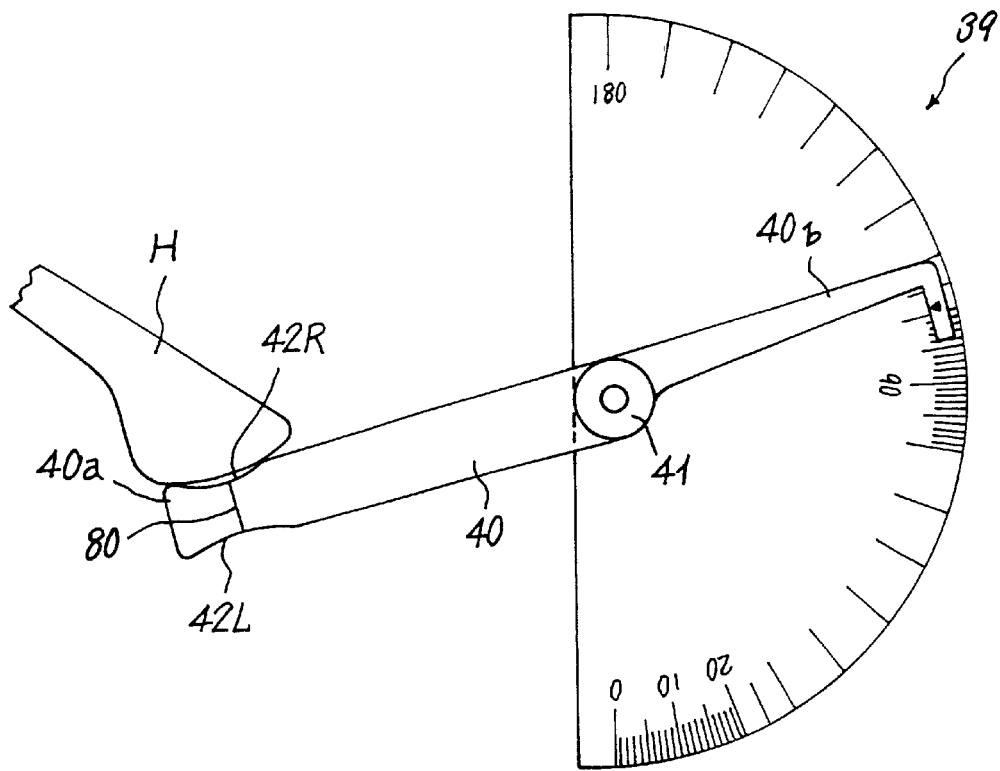
FIG. 13 is a front elevation showing one example of method for measuring the sole angle of the leading edge.
Figure 15:
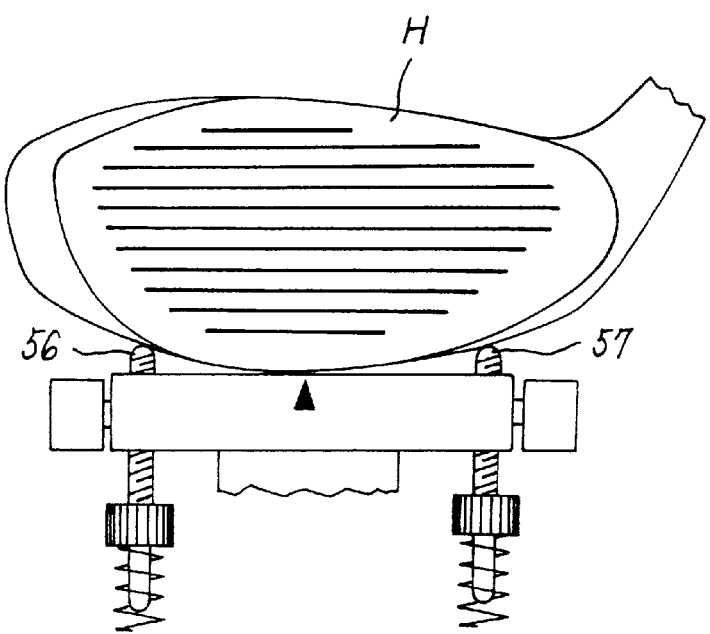
FIG. 15 is a front elevation of the club head which is maintained in a predetermined posture on the head-holding assembly.

The sole of the club head is brought into contact with the concave 42R of the ruler 40 as shown in FIG. 13 with the center thereof matched with the centerline 80. In this state, a scoop or balance angle of a sand wedge will be measured using the protractor 39. For this measurement, the X-direction slide plate 32 is horizontally moved and the protractor 39 is vertically moved in order that the sole is reliably received in the concave 42R.

Measurement of Offset of Leading Edge

Figure 14:
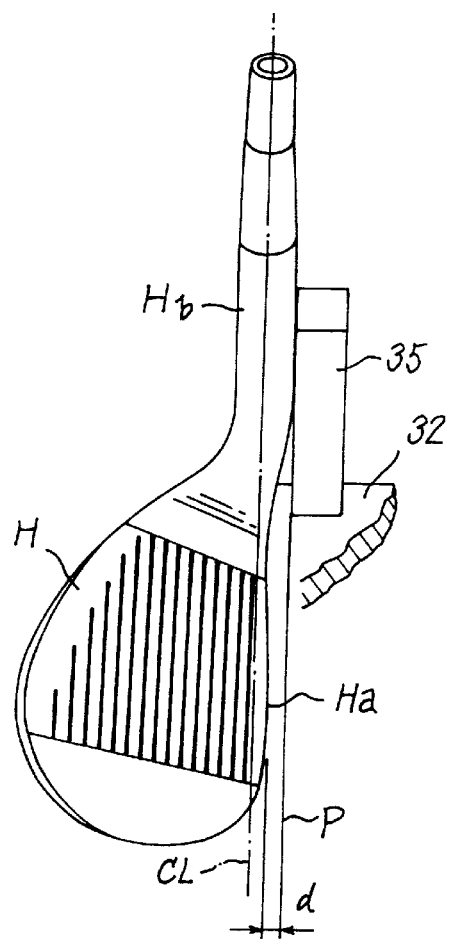
FIG. 14 is a perspective view showing one example of method for measuring the offset of the leading edge.

Referring to FIG. 14, the pole 35 is brought into contact with a neck Hb of an iron club having a center line CL. In this state, a distance d (offset) in the direction X between a virtual plane P including the contact surface of the pole 35 and neck Hb, and the leading edge Ha is read using the scale 45 similarly to the face progression. The edge is classified into a no-offset edge (straight edge), slightly offset edge, moderately offset edge, extremely offset edge in accordance with the distance d.

Measurement of Wooden Club

The head-holding assembly 50 is placed on the Y-direction slide plate 30 so as to be slidable thereon by fitting the long projection 51a (shown in FIG. 7) in the recess 34 of the Y-direction slide plate 30 as shown in FIGS. 9 and 10. Further, the X-direction recess of the protractor 66 is engaged with the projection 65 of the X-direction slide plate 32, thereby enabling the protractor 66 to slide on the X-direction slide plate 32.

A club shaft 81 is lightly grasped by the grooved frames 16 of the gripper 17 of the club-holding assembly 4 (shown in FIG. 1) in order that a wooden club head H is substantially flush with the head-holding assembly 50. In this state, the position of the head-holding assembly 50 is determined by moving the Y-direction slide plate 30 and the X-direction slide plate 32 in order that the head H is present at the center of the upper plate 53.

The knob 10 is turned to adjust the inclination angle of the club shaft 81, so that the sole near the edge of the head H comes into contact with the projections 56 and 57 on the head-holding assembly 50 which have been adjusted to be substantially flush with each other or preferably to be quite flush with each other. In this state, the club shaft 81 is turned so as to adjust the orientation of the club face. The projections 56 and 57 come into contact with the sole of the club head H because of the resiliency of the compression springs 60 and 61. Thereafter, the knob 22 (shown in FIG. 1) is tightened in order to firmly grasp the club shaft 81 with the club-holding assembly 4 via the gripper 17. The club is maintained in a first predetermined posture ready for the following measurements.

Measurement of Lie Angle

The lie angle of the wooden club indicated by the pointer 9 (shown in FIG. 1) is read based on the divisions 7 (in FIG. 1) of the protractor 8 as with the measurement of the lie angle of the iron club.

Measurement of Face Orientation

Referring to FIG. 9, projections 73 and 74 of the measuring piece 71 are brought into uniform contact with the face of the head H. In this state, a division indicated by the tapered end 71b of the measuring piece 71 is read on the protractor 70.

Measurement of Original Loft Angle

Figure 11:
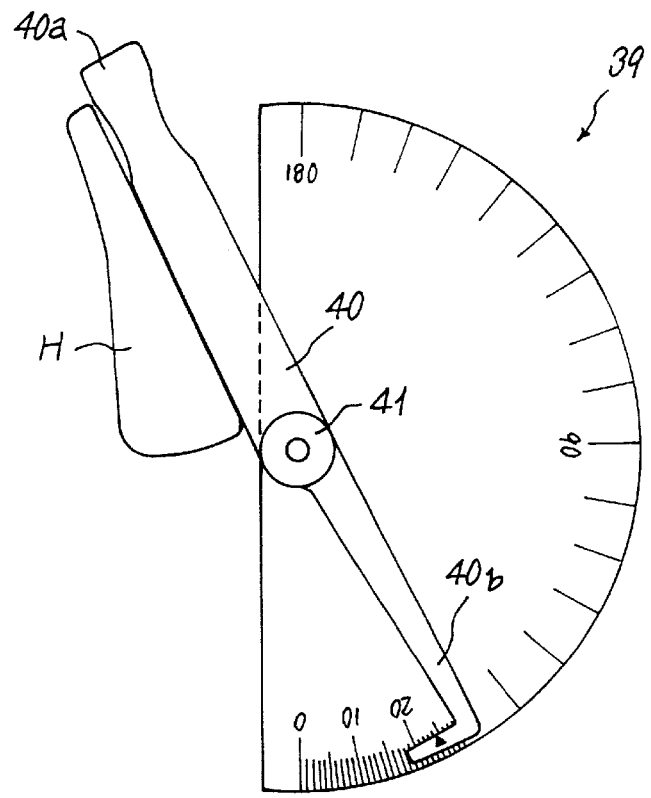
FIG. 11 is a front elevation showing one example of method for measuring the loft angle of the club face using a protractor.

Similarly to the loft angle measurement of the iron club shown in FIG. 11, the arm 40a of the ruler 40 of the protractor 39 is brought into contact with the face of the wooden club by turning the knob 41. Then, a measured loft angle is read on the basis of the position of the arm 40b.

Measurement of Real Loft Angle

As shown in FIG. 9, the projections 73 and 74 of the measuring piece 71 are brought into uniform contact with the face of the club head H. The shaft of the club is slightly and manually turned in order that the tapered end 71b of the measuring piece 71 indicates the division "0" on the protractor 70. In this state, the club is maintained in a second predetermined posture and is ready for the following measurements.

The real loft angle represents a loft angle by which a golf player actually addresses a ball in such a manner that the club face faces an orbit of a flying ball.

Measurement of Face Progression

Figure 16:
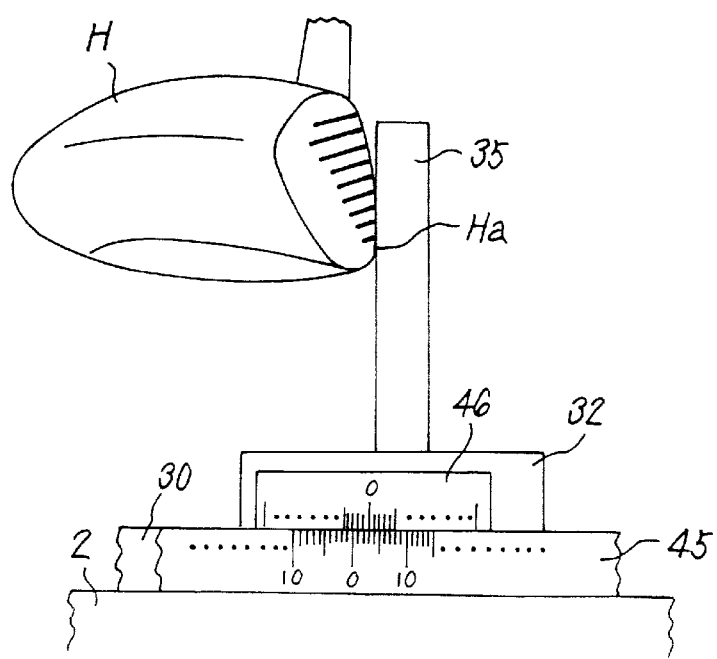
FIG. 16 shows one example of method for measuring the face progression.

Referring to FIG. 16, the pole 35 is brought into contact with the leading edge Ha of the club head H, and a division of the scale 45 is read on the basis of division "0" of the vernier 46, as with the measurement of the face progression of the iron club. Since the leading edge Ha is moderately curved, the face progression is measured at the most bulged point.

Measurement of Sole Inversion

The projection 58 is turned and raised with the sole of the club head placed on the head-holding assembly 50, and a raised amount of the projection 58 is measured using the caliper when the projection 58 comes into contact with the sole. Referring to FIG. 10, the projection 58 is positioned near the rear part of the sole. Depending upon either an open face or a closed face, the head-holding assembly 50 is turned by 180° with respect to the Y-direction slide plate 30 so that the projection 58 is positioned near the front part of the sole. In this state, the sole inversion will be measured.

The foregoing measurements are related to the clubs for right-handed users. In order to measure clubs for left-handed users, the X-direction slide plate 32 is turned by 180° with respect to the Y-direction slide plate 30, so that the club face regulator 37 and the protractor 39 are oriented for measurements of left-handed clubs. The measurements are carried out in accordance with the procedures for the right-handed clubs.

Figure 17:
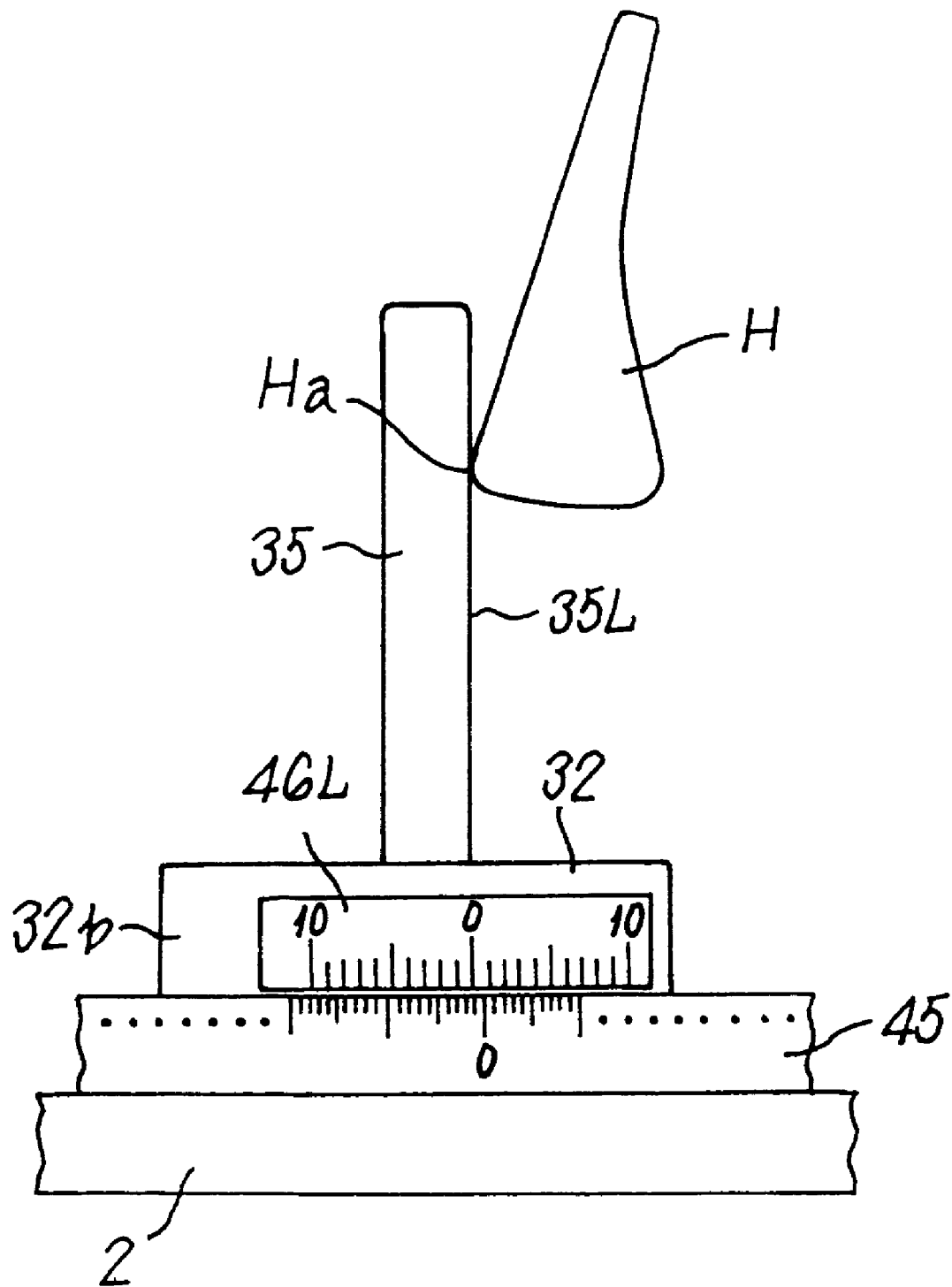
FIG. 17 shows one example of method for measuring the progression of the leading edge of a club for a left-handed user.

FIG. 17 shows the state in which the X-direction slide plate 32 is turned by 180° with respect to the Y-direction slide plate 30. In this case, the club face regulator 37 is detached from the pole 35. Alternatively, it may be moved down to the bottom of the pole 35.

A vernier 46L for left-handed clubs is provided on a side surface 32b (opposite to the side surface 32a) of the X-direction slide plate 32. The division "0" of the vernier 46L is present in a virtual vertical plane including outer side surfaces of the poles 35 and 36 (i.e. a right side surface 35L in FIG. 17) in FIG. 1.

Some iron clubs have faces with dots marked thereon in place of grooves. The foregoing club face regulator 37 is not effectively applicable to such clubs. Therefore, the posture of the club is adjusted using the head-holding assembly 50, i.e. by bringing the sole and toe of the club into contact with the projections 56 and 57 which are adjusted to have the same height, thereby adjusting the posture of the club in accordance with the procedure for the measurement of the real loft angle.

The gripper 17 is provided on the club-holding assembly 4 as described previously with reference to FIG. 1. Therefore, a height of the club head with respect to the base 2 is adjusted by obliquely lifting or lowering the club shaft lightly grasped by the gripper 17. When the club head reaches a predetermined position, the gripper 17 is fastened to firmly hold the club shaft by the club-holding assembly 4.

Alternatively, the gripper 17 firmly grasping the club shaft may be moved on the club-holding assembly 4.

Figure 18:
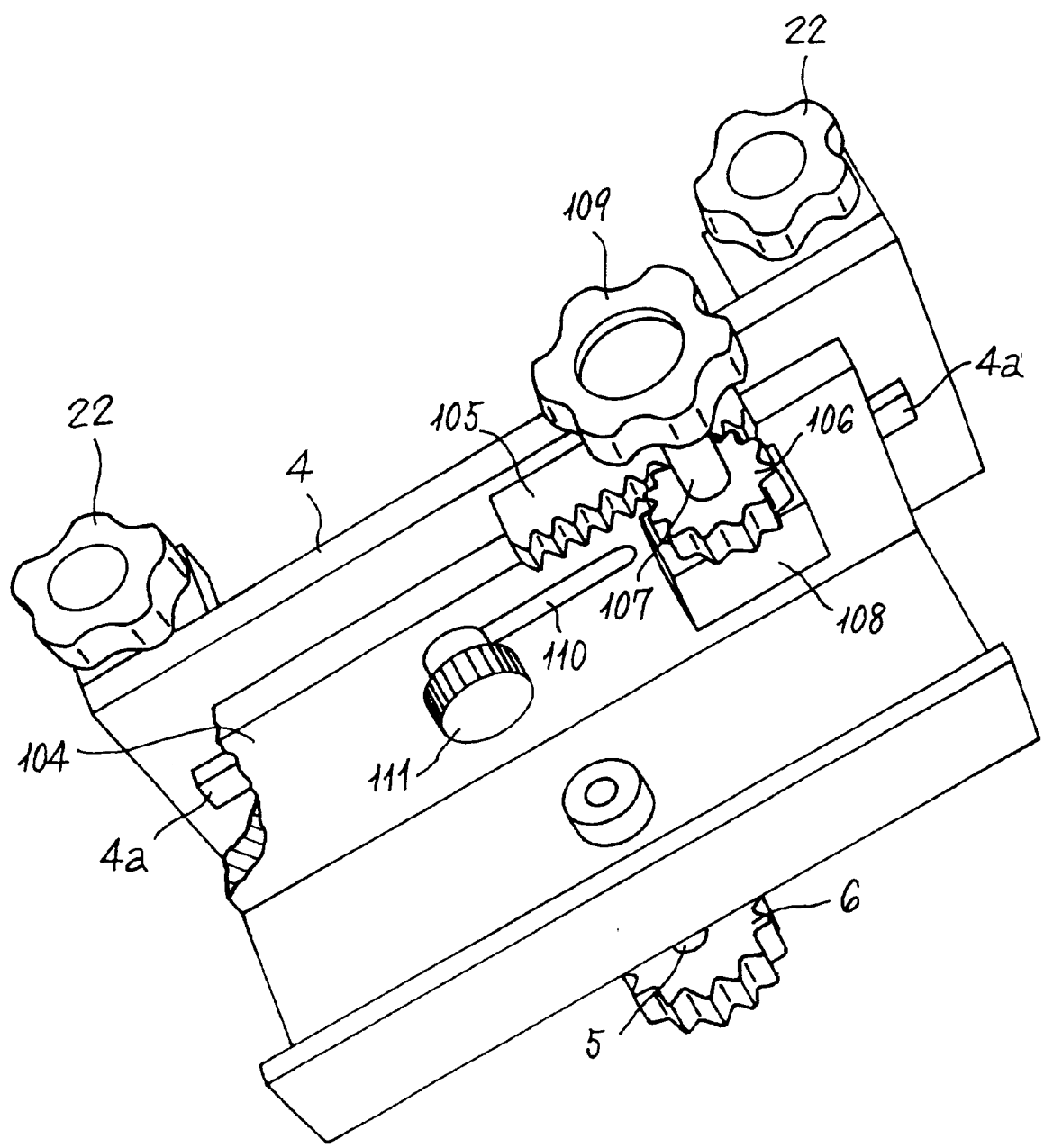
FIG. 18 is a perspective view of a part of a protractor used for measuring the golf club in a second embodiment of the invention.

FIG. 18 shows a second embodiment in which the club-holding assembly 4 including the gripper 17 is reciprocated on a base plate 104 for the club-holding assembly 4.

The base plate 104 has a recess on its upper surface, which is parallel to the centerline 18 (shown in FIG. 18). A long projection 4a on the bottom of the club-holding assembly 4 is slidably engaged in this recess. Further, a rack 105 which is parallel to the long projection 4a is fixedly attached on the bottom of the club-holding assembly 4. A pinion 106 to be engaged with the rack 105 is provided on the base plate 104. One end of a shaft 107 of the pinion 106 is rotatably supported by a bearing block 108 provided on the base plate 104. A knob 109 for turning the pinion 106 is fixedly attached to the other end of the shaft 107. The base plate 104 has an elongate hole 110 in parallel to the long projection 4a. A threaded shaft of a fastening knob 111 is inserted into the elongate hole 110, and has its tip threadably engaged with the club-holding assembly 4.

With the fastening knob 111 slightly loosened, the knob 109 is turned forward or backward in order to move the club-holding assembly 4 up or down with respect to the base plate 104, so that the height of the club head grasped by the gripper 17 will be adjusted. Thereafter, the fastening knob 111 is tightened, thereby firmly fixing the club-holding assembly 4 to the base plate 104.

Upward or downward movement of the club-holding assembly 4 facilitates positioning of the club head. The positioning of the club head will be further facilitated when appropriate friction is applied between the club-holding assembly 4 and the base plate 104 so that the club-holding assembly 4 is not easily shifted on the base plate 104.

The lie angle, loft angle, face progression and sole inversion of a putter will be measured using the head-holding assembly 50 and the protractor 66 by the procedure similar to that of the wooden club.

What is claimed is:

1. A golf club measuring apparatus comprising:
   a base having a flat top reference surface;
   a club-holding assembly pivotally mounted to the base above the flat top reference surface of the base for pivoting movement about a pivot axis;
   club-gripping means for releasably holding a club shaft, including a pair of grooved frames which are provided with v-shaped grooves, faced with each other, and are arranged at least at two positions on the club-holding assembly, and having a reference line passing through the centers of the v-shaped grooves and obliquely intersecting with the reference surface of the base;
   a Y-direction slide plate provided on the base and being slidable in a direction (Y direction) which is parallel to the line of intersection between a virtual vertical plane including the reference line and the reference plane;
   an X-direction slide plate detachably arranged on the Y-direction slide plate and being movable in a direction (X direction) which is orthogonal to the sliding direction of the Y-direction slide plate;
   a first pole standing upright on the X-direction slide plate;
   a club face regulator provided on the first pole, being vertically movable, and having a reference line parallel to the Y-direction;
   a second pole standing upright on the X-direction slide plate;

a first protractor provided on the second pole for measuring a loft angle of the club whose face orientation is regulated by the club face regulator;

a second protractor provided with a scale on an circular surface around the pivot axis and used for measuring an angle of inclination of the reference line with respect to the reference surface; and a scale for measuring a distance between the X-direction slide plate and the virtual vertical plane on the plane which is parallel to the X direction of the Y-direction slide plate.

2. A golf club measuring apparatus comprising:

a base having a flat top reference surface;

a club-holding assembly pivotally mounted to the base above the flat top reference surface of the base for pivoting movement about a pivot axis;

club-gripping means for releasably holding a club shaft, including a pair of grooved frames which are provided with v-shaped grooves, faced with each other, and are arranged at least at two positions on the club-holding assembly, and having a reference line passing through the centers of the v-shaped grooves and obliquely intersecting with the reference surface of the base;

a Y-direction slide plate provided on the base and being slidable in a direction (Y direction) which is parallel to the line of intersection between a virtual vertical plane including the reference line and the reference plane;

an X-direction slide plate detachably arranged on the Y-direction slide plate and being movable in a direction (X direction) which is orthogonal to the sliding direction of the Y-direction slide plate;

a pole standing upright on the X-direction slide plate;

a head-holding assembly detachably provided on the Y-direction slide plate and holding a sole of a wooden club head grasped by the club-holding assembly;

a protractor detachably provided on the X-direction slide plate and measuring a face orientation of the wooden club;

a protractor having divisions on a circular plate with a center point in agreement with the pivot axis;

a protractor detachably attached to the pole and used for measuring a loft angle of the club; and a scale for measuring a distance between the X-direction slide plate and the virtual vertical plane on the plane which is parallel to the X direction of the Y-direction slide plate.

3. The apparatus of claim 1, wherein the X-direction slide plate is symmetrical to a plane which includes a centerline of the first pole and traverses the X-direction.

4. The apparatus of claim 1 or 2, further including a knob for swinging the club-holding assembly, wherein a shaft of the knob and a pivot shaft of the club-holding assembly are linked via a gear train including odd intermediate gears.

5. The apparatus of claim 1 or 2, wherein each pair of grooved frames are configured to slide around a shaft which is vertical with respect to the club-holding assembly.

6. The apparatus of claim 1 or 2, wherein the club-holding assembly is movable in the direction of the reference line with respect to the pivot axis.

7. The apparatus of claim 2, wherein the protractor to measure the loft angle includes a ruler which has a pair of arms mounted thereon for pivoting movement about a pivot as of the protractor, and one arm is in contact with the face of the club while the other arm indicates divisions of the protractor.

8. The apparatus of claim 7, wherein one of the arms has a pair of concave recesses along opposite side edges thereof with which the sole of an iron club whose face orientation is regulated by the face regulator is brought into contact.

9. The apparatus of claim 2, wherein the head-holding assembly includes retractable projections provided at positions corresponding to a toe, heel and rear part of the sole, the retractable projections regulating the sole of the club head.

10. The apparatus of claim 2, wherein the X-direction slide plate is symmetrical to a plane which includes a centerline of the first pole and traverses the X direction.

11. A golf club measuring apparatus comprising;

a base having a flat top reference surface;

a club-holding assembly pivotally mounted to the base above the flat top reference surface of the base for pivoting movement about a pivot axis;

a club-gripping mechanism configured to releasably hold a club shaft, including a pair of grooved frames which are provided with v-shaped grooves, faced with each other, and are arranged at least at two positions on the club-holding assembly, and having a reference line passing through the centers of the v-shaped grooves and obliquely intersecting with the reference surface of the base;

a Y-direction slide plate provided on the base and being slidable in a direction (Y direction) which is parallel to the line of intersection between a virtual vertical plane including the reference line and the reference plane;

an X-direction slide plate detachably arranged on the Y-direction slide plate and being movable in a direction (X direction) which is orthogonal to the sliding direction of the Y-direction slide plate;

a first pole standing upright on the X-direction slide plate;

a club face regulator provided on the first pole, being vertically movable, and having a reference line parallel to the Y direction;

a second pole standing upright on the X-direction slide plate;

a first protractor provided on the second pole and configured to measure a loft angle of the club whose face orientation is regulated by the club face regulator;

a second protractor provided with a scale on an circular surface around the pivot axis and configured to measure an angle of inclination of the reference line with respect to the reference surface; and a scale configured to measure a distance between the X-direction slide plate and the virtual vertical plane on the plane which is parallel to the X direction of the Y-direction slide plate.

12. A golf club measuring apparatus comprising:

a base having a flat top reference surface;

a club-holding assembly pivotally mounted to the base above the flat top reference surface of the base for pivoting movement about a pivot axis;

a club-gripping mechanism configured to releasably hold a club shaft, including a pair of grooved frames which are provided with v-shaped grooves, faced with each other, and are arranged at least at two positions on the club-holding assembly, and having a reference line passing through the centers of the v-shaped grooves and obliquely intersecting with the reference surface of the base;

a Y-direction slide plate provided on the base and being slidable in a direction (Y direction) which is parallel to the line of intersection between a virtual vertical plane including the reference line and the reference plane;

an X-direction slide plate detachably arranged on the Y-direction slide plate and being movable in a direction (X direction) which is orthogonal to the sliding direction of the Y-direction slide plate;

a pole standing upright on the X-direction slide plate, a head-holding assembly detachably provided on the Y-direction slide plate and holding a sale of a wooden club head grasped by the club-holding assembly;

a protractor detachably provided on the X-direction slide plate and configured to measure a face orientation of the wooden club;

a protractor having divisions on a circular plate with a center point in agreement with the pivot axis;

a protractor detachably attached to the pole and configured to measure a loft angle of the club; and a scale configured to measure a distance between the X-direction slide plate and the virtual vertical plane on the plane which is parallel to the X direction of the Y-direction slide plate.

13. The apparatus of claim 11, wherein the X-direction slide plate is symmetrical to a plane which includes a centerline of the first pole and traverses the X direction.

14. The apparatus of claim 11 or 12, further including a knob configured to swing the club-holding assembly, wherein a shaft of the knob and a pivot shaft of the club-holding assembly are linked via a gear train including odd intermediate gears.

15. The apparatus of claim 11 or 12, wherein each pair of grooved frames are configured to slide around a shaft which is vertical with respect to the club-holding assembly.

16. The apparatus of claim 11 or 12, wherein the club-holding assembly is movable in the direction of the reference line with respect to the pivot axis.

17. The apparatus of claim 12, wherein the protractor to measure the loft angle includes a ruler which has a pair of arms mounted thereon for pivoting movement about a pivot axis of the protractor, and one arm is in contact with the face of the club while the other arm indicates divisions of the protractor.

18. The apparatus of claim 17, wherein one of the arms has a pair of concave recesses along opposite side edges thereof with which the sole of an iron club whose face orientation is regulated by the face regulator is brought into contact.

19. The apparatus of claim 12, wherein the head-holding assembly includes retractable projections provided at positions corresponding to a toe, heel and rear part of the sole, the retractable projections configured to regulate the sole of the club head.

20. The apparatus of claim 12, wherein the X-direction slide plate is symmetrical to a plane which includes a centerline of the first pole and traverses the X direction.

* * * * *